(12) United States Patent
Ur et al.

(10) Patent No.: US 12,067,560 B2
(45) Date of Patent: Aug. 20, 2024

(54) SYSTEM AND METHOD FOR TRANSFERRING DATA REPRESENTING TRANSACTIONS BETWEEN COMPUTING NODES OF A COMPUTER NETWORK

(71) Applicant: Source Ltd., Valletta (MT)

(72) Inventors: Shmuel Ur, Shorashim (IL); Ilya Dubinsky, Kefar Sava (IL)

(73) Assignee: SOURCE Ltd., Valletta (MT)

( * ) Notice: Subject to any disclaimer, the term of this patent is extended or adjusted under 35 U.S.C. 154(b) by 266 days.

(21) Appl. No.: 16/689,106

(22) Filed: Nov. 20, 2019

(65) Prior Publication Data

US 2021/0150527 A1    May 20, 2021

(51) Int. Cl.
G06Q 20/40        (2012.01)
G06Q 20/38        (2012.01)
H04L 9/00         (2022.01)
H04L 9/32         (2006.01)

(52) U.S. Cl.
CPC ....... *G06Q 20/401* (2013.01); *G06Q 20/3825* (2013.01); *G06Q 20/3829* (2013.01); *H04L 9/3247* (2013.01); *H04L 9/50* (2022.05)

(58) Field of Classification Search
CPC ............. G06Q 20/401; G06Q 20/3825; G06Q 20/3829; H04L 9/0643; H04L 9/3247; H04L 2209/38
USPC .......................................................... 705/75
See application file for complete search history.

(56) References Cited

U.S. PATENT DOCUMENTS

| | | | |
|---|---|---|---|
| 11,074,558 B1* | 7/2021 | Johnstone | G06Q 20/0855 |
| 2016/0364787 A1* | 12/2016 | Walker | H04L 9/0891 |
| 2017/0178072 A1* | 6/2017 | Poornachandran | G06Q 20/3829 |
| 2018/0241546 A1* | 8/2018 | Leng | G06Q 20/38215 |
| 2018/0343307 A1* | 11/2018 | Lotter | G06Q 50/188 |
| 2019/0102850 A1* | 4/2019 | Wheeler | G06Q 20/405 |
| 2019/0130394 A1* | 5/2019 | Stollman | H04L 9/3239 |
| 2019/0180291 A1* | 6/2019 | Schmeling | H04L 9/3268 |
| 2019/0205894 A1* | 7/2019 | Gonzales, Jr. | G06Q 20/3829 |
| 2019/0340623 A1* | 11/2019 | Rivkind | H04L 9/50 |
| 2019/0394026 A1* | 12/2019 | Bookman | H04L 9/50 |
| 2020/0118094 A1* | 4/2020 | Haldenby | G06Q 20/065 |
| 2020/0242711 A1* | 7/2020 | Cao | G06Q 40/04 |
| 2020/0403805 A1* | 12/2020 | Steele | H04L 9/3242 |

(Continued)

*Primary Examiner* — Courtney P Jones
(74) *Attorney, Agent, or Firm* — PEARL COHEN ZEDEK LATZER BARATZ LLP

(57) ABSTRACT

A system and method for transferring data representing one or more transactions between computing nodes of a computer network by at least one intermediary node may include: receiving a transaction request, for transferring ownership of a product from a current owner to a subsequent owner, the transaction request being signed by the current owner; authenticating the signature of the current owner; accessing a product chain associated with the product; extracting from the product chain a list of target user entities and a contract data element; producing an ownership block including an identification of the subsequent owner; appending the ownership block to the product chain, to indicate transfer of ownership from the current owner to the subsequent owner; and transferring data representing one or more transactions between the intermediary node and one or more computing nodes based on the transaction request.

17 Claims, 6 Drawing Sheets

(56) References Cited

U.S. PATENT DOCUMENTS

2021/0021432 A1\* 1/2021 Atkins .................... H04L 9/50
2022/0277261 A1\* 9/2022 Stollman ................ G06Q 10/08

\* cited by examiner

SYSTEM AND METHOD FOR TRANSFERRING DATA REPRESENTING TRANSACTIONS BETWEEN COMPUTING NODES OF A COMPUTER NETWORK

FIELD OF THE INVENTION

The present invention relates generally to computer communication. More specifically, the present invention relates to managing of transferal of data representing one or more transactions between computing nodes of a computer network.

BACKGROUND OF THE INVENTION

Use of blockchain data structures and technology has become ubiquitous in various data applications and implementations that require management of distributed or decentralized data, while maintaining a high level of data security.

State-of-the-art systems for product lifecycle management (PLM) may use blockchain-based data structures and methodologies to track properties of a product throughout the product's lifecycle. However, operations involving blockchain data structures may not be feasible for supporting a large number of online product-related data transactions.

For example, blockchain-based transactions may be computationally intensive and may thus incur a long or even unacceptable latency on online transactions such as online monetary exchange (ME) transactions.

In another example, blockchain-based, product-related transactions may require accessibility of one or more (e.g., all) parties participating in the block chain so as to process and/or approve the transaction.

Furthermore, blockchain-based transactions may involve a plurality of singular, end-to-end transactions among the one or more (e.g., all) participating parties. This may incur a toll (e.g., in computer network congestion, in actual monetary fees, etc.) and may prove to be inefficient for managing a large number of product-related transactions.

On the other hand, state-of-the-art technology for handling transactions, such as monetary exchange transactions between two parties have evolved to optimally (e.g., in terms of timewise efficiency and/or efficiency of computational resources) perform the online transactions between computing devices or nodes on a computing network.

For example, ME transactions between a first computing device or node (e.g., an acquirer server handling a bank account of a merchant) associated with a first entity (e.g., the merchant) and a second computing device or node (e.g., a banking server where a client's bank account is handled) associated with a second entity (e.g., the client) may be handled by an intermediary computing device or node (e.g., an issuer server associated with the client's credit card issuer) associated with a third, intermediary entity (e.g., the issuer).

However, available systems for handling transaction data (e.g., handling data representing ME transactions by an intermediary computing device or node) lack the benefits provided by available PLM systems as elaborated above.

SUMMARY OF THE INVENTION

A system and a method that may provide technology for product lifecycle management and that may: (a) securely track, using or on a data structure (e.g., a blockchain-based data structure), one or more product-related events; (b) support a high volume of online product-related events, in a manner that may have low latency and may provide accessibility (e.g., according to predefined levels of permission) to a plurality of entities or parties; and (c) enable permitted entities to interact or perform actions pertaining to the product on the data structure is therefore desired.

For example, embodiments of the invention may use technology adapted to track product-related properties such as ownership of a specific product and/or ownership of a group of products.

Embodiments of the invention may provide new and improved data structures which may, on the one hand, effectively represent product-related properties, including relationships among corresponding entities (e.g., owners and non-owners of the products) and may, on the other hand, facilitate transactions (e.g., ME transactions) among these entities in a manner that is more efficient than currently available technologies for transferal of data transactions (e.g., ME transactions).

Additionally, or alternatively, embodiments of the invention may be adapted to receive one or more data elements that may relate to or may be included in a smart contract pertaining to the product and/or group of products.

Embodiments of the invention may enable an entity (e.g., a user) to cause technology to alter data structures to perform one or more actions relating to the product (e.g., purchase the product from a previous owner) and enforce or carry out the smart contract according to the type of actions and/or according to information stored on the data structure (e.g., the blockchain based data structure), in a substantially concurrent manner, as elaborated herein.

Embodiments of the invention may include a method of transferring data representing one or more transactions between computing nodes of a computer network by at least one intermediary node. Embodiments of the method may include: receiving data representing a transaction request, for transferring ownership of at least one product from a current owner to a subsequent owner. The transaction request may include a public key of the subsequent owner and may be signed by a private key of the current owner; authenticating the signature of the current owner, according to a public key of the current owner; accessing at least one product chain respectively associated with the at least one product; extracting from the at least one product chain at least one respective list of target user entities and at least one corresponding contract data element; producing at least one ownership block, may include an identification of the subsequent owner, and appending the at least one ownership block to the respective at least one product chain, to indicate transfer of ownership from the current owner to the subsequent owner; and transferring data representing one or more transactions between the intermediary node and one or more computing nodes associated with one or more target user entities of the at least one list of target user entities and the subsequent owner, based on the transaction request.

According to some embodiments, data representing the transaction request may include an ownership code associated with the current owner. Embodiments of the invention may include: analyzing the ownership code; and accessing and/or enabling access of the at least one product chain based on said analysis.

Embodiments of the invention may include calculating the ownership code as a function of a private key of the current owner and an identification of the at least one product chain.

According to some embodiments of the invention, analyzing the ownership code may include extracting the identification of the at least one product chain from an ownership code. Additionally, according to some embodiments of the invention, accessing and/or enabling access to the at least one product chain may include: authenticating the identity of the current owner based on a public key of the current owner; and accessing the at least one product chain according to the extracted product chain identification.

Embodiments of the invention may include resolving the transaction request among the one or more target user entities and the subsequent owner according to the one or more contract data elements.

According to some embodiments, the transaction request further may include a null price value, and wherein the one or more transactions between the intermediary node and one or more computing nodes may include notification transactions pertaining to transfer of ownership from the current owner to the subsequent owner.

According to some embodiments, the transaction request may include a price of the at least one product. Embodiments of the invention may include performing arbitration of the price among one or more target user entities and the subsequent owner according to the one or more contract data elements. Performing one or more transactions may include performing monetary exchange (ME) transactions among the one or more target user entities and the subsequent owner according to the arbitration.

According to some embodiments, the one or more ME transactions may be performed substantially concurrently.

According to some embodiments, the one or more target user entities may be selected from a list consisting of: the current owner, one or more previous non-owner users and one or more previous owners of the at least one product.

According to some embodiments, the public key of the subsequent owner of the at least one product may include an identification of a paying instrument associated with the subsequent owner.

According to some embodiments, the at least one product chain may be a distributed block chain data element, and may include one or more ownership blocks. Each ownership block may include at least one of: an identification of an owner of the product; a public key associated with the owner; a type of the owner; an identification of a non-owner entity; and a contract element pertaining to transfer of ownership between the owner and at least one other owner in the product chain.

Embodiments of the invention may include repeating the steps of receiving, authenticating, addressing, extracting, producing and appending in a plurality of iterations, until a trigger condition is met.

According to some embodiments, the at least one contract data element may be selected from a list consisting of: a definition of a contract relation, a definition of a trigger condition and a definition of a contract timing condition.

According to some embodiments, performing the one or more transactions may be done in response to occurrence of a trigger event that meets at least one of the trigger condition and contract timing condition.

Embodiments of the invention may include: sending one or more data elements of the transaction request to the computing node of the subsequent owner; receiving a confirmation indication from the computing node of the subsequent owner; analyzing the confirmation indication in view of the transaction request; and appending of the ownership block and the performance of the one or more transactions, based on the analysis of the confirmation indication.

According to some embodiments, the at least one transaction request may pertain to a plurality of products. Data representing the at least one transaction request may include: an identification of a plurality of product chains associated with the respective plurality of products; and a plurality of prices associated with the respective plurality of products.

Embodiments of the invention may include updating an ownership block of the current owner, to comprise one or more data elements pertaining to resolution of a payment, selected from a list consisting of: an identity of one or more target user entities and a respective payment amount.

Embodiments of the invention may include a system for transferring data representing one or more transactions between computing nodes of a computer network. Embodiments of the system may include a non-transitory memory device (e.g., element 4 of FIG. 1), wherein modules of instruction code may be stored, and a processor or controller (e.g., element 2 of FIG. 1) associated with the memory device, and configured to execute the modules of instruction code. Upon execution of said modules of instruction code, the processor may be configured to: receive data representing a transaction request, for transferring ownership of at least one product from a current owner to a subsequent owner, the transaction request may include a public key of the subsequent owner and being signed by a private key of the current owner; authenticate the signature of the current owner, according to a public key of the current owner; access at least one product chain respectively associated with the at least one product; extract from the at least one product chain at least one respective list of target user entities and at least one corresponding contract data element; produce at least one ownership block, may include an identification of the subsequent owner; append the at least one ownership block to the respective at least one product chain, to indicate transfer of ownership from the current owner to the subsequent owner; and transfer data representing one or more transactions between the intermediary node and one or more computing nodes associated with one or more target user entities of the at least one list of target user entities and the subsequent owner, based on the transaction request.

Embodiments of the invention may include a non-transitory computer readable storage medium (e.g., elements 4 and/or 6 of FIG. 1) storing a set of instructions (e.g., element 5 of FIG. 1) for causing a computer to transfer data representing one or more transactions between computing nodes of a computer network, by performing the operations of: receiving data representing a transaction request, for transferring ownership of at least one product from a current owner to a subsequent owner, the transaction request may include a public key of the subsequent owner and being signed by a private key of the current owner; authenticating the signature of the current owner, according to a public key of the current owner; accessing at least one product chain respectively associated with the at least one product; extracting from the at least one product chain at least one respective list of target user entities and at least one corresponding contract data element; producing at least one ownership block, may include an identification of the subsequent owner, and appending the at least one ownership block to the respective at least one product chain, to indicate transfer of ownership from the current owner to the subsequent owner; and transferring data representing one or more transactions between the intermediary node and one or more computing nodes associated with one or more target user entities of the at least one list of target user entities and the subsequent owner, based on the transaction request.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
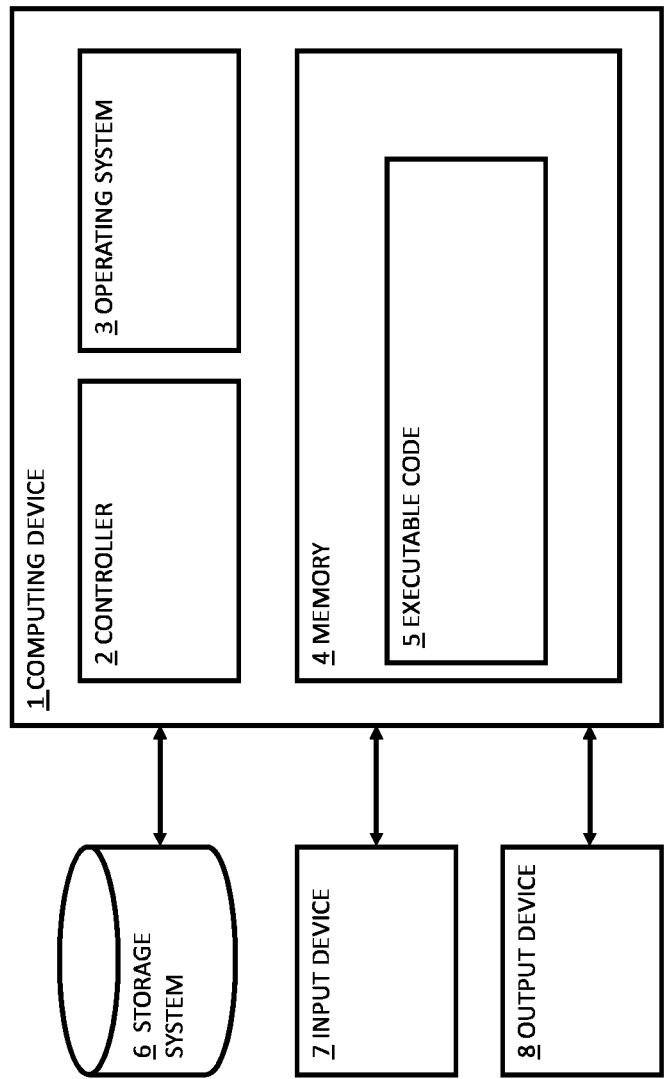
FIG. 1 is a block diagram, depicting a computing device which may be included in a system for transferring, or managing transferal of data representing one or more transactions between computing nodes of a computer network according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention may include a system and a method of transferring or managing transferal of data representing one or more transactions between computing nodes of a computer network.

The following Table 1 includes a list of terms used throughout this document, alongside respective, non-limiting explanation of the terms, for the reader's convenience:

TABLE 1

| | |
|---|---|
| Node | The term 'node' may be used herein to refer to a computerized system, used for processing and/or routing transactions within a network of nodes. Nodes may include, for example: an individual computer, a server in an organization and a site operated by an organization (e.g. a data center or a server farm operated by an organization). For example, in Monetary Exchange (ME) transactions, nodes may include a server in a banking system, a computer of a paying-card issuer, a computer associated with a merchant of a product, a computer associated with a buyer of a product, etc. |

TABLE 1-continued

| | |
|---|---|
| Transaction | The term 'transaction' may be used herein to refer to communication of data between a source node and a destination node of a computer network.<br>According to some embodiments, transactions may include a single, one-way transfer of data between the source node and the destination node. For example: a first server may propagate at least one data file to a second server as a payload within a transaction. Alternately, transactions may include a plurality of data transfers between the source node and the destination node. For example, a transaction may be or may include a monetary exchange between two institutions (such as banks), operating computer servers and computer equipment, where in order to carry out the transaction data needs to be transferred between the servers and other computer equipment operated by the institutions. Transaction, transaction payload, and transaction request may also refer to data structures described herein representing these entities and events. |
| Transaction payload | The term 'payload' may be used herein to refer to at least one content of a transaction that may be sent from the source node to the destination node. Payloads may include, for example: information included within the transaction (e.g. parameters of a financial transaction, such as a sum and a currency of a monetary exchange), a data file sent over the transaction, etc. |
| Transaction request | The term "transaction request" may be used herein to refer to data representing a request placed by a user, for a transaction between a source node and a destination node of a computer network (or between entities controlling, using or owning the nodes). For example, a user who is an owner of at least one product may initiate a request to transfer ownership of the at least one product to a second user, each using nodes, the requests described by data structures as described herein. In another example, a user may initiate a request to perform a monetary exchange transaction, between a source node (e.g. a server of a first bank) and a destination node (e.g. a server of a second bank), the transactions described by data structures as described herein. |
| User | The term 'user' may be used herein to refer to one or more human or individuals (e.g., a person) or organizations that may be associated with at least one computing device or node of the computer network. Alternatively, the term 'user' may refer herein to the at least one computing device or node that may be associated with the user. |
| Product | The term 'product' may be used herein to refer to any type of commodity, substantial or virtual, which ownership may be transferred among users.<br>According to some embodiments, transferal of ownership may involve an ME transaction (e.g., a payment) among respective users. Additionally, or alternatively, transferal of ownership may include one or more entitlements pertaining to ownership of the product and may not include an ME transaction among the respective users. |
| Product chain | The term "product chain" may be used herein to refer to a data structure that may be utilized by embodiments of the invention to maintain a record of ownership of a product or a group of products among one or more users, as elaborated herein. |
| Owner | The term 'owner' may be used herein to refer to a user that may be attributed ownership of a product, based on ownership data included in a product chain pertaining to that product.<br>In this context: (a) the term "current owner" may be used herein to refer to a user who may be presently attributed ownership of the product, (b) the term "previous owner" may be used herein to refer to a user who may have been attributed ownership of the product at a previous point in time and (c) the term "subsequent owner" may be used herein to refer to a user who may be attributed ownership of the product (e.g., to become a "current owner") at a future point in time (e.g., following a process of transferal of ownership).<br>The terms "user" and "owner" may be used interchangeably if appropriate, according to context to describe the same entity, as users may become owners and vice-versa, as elaborated herein. |
| Non-owner user | The term "non-owner user" may be used herein to refer to a user who may be associated with a product but may not be attributed ownership of the product. Thus, non-owner users may not be entitled to perform actions in relation to a product chain of the product, but may be included, for example, in a process of payment resolution, as elaborated herein. |
| Target user entity | The term "target user entity" may be used herein to refer to a user who may be included in a transaction (e.g., an ME transaction) among one or more users associated with nodes of the computer network. For example, target user entities may include a current owner, one or more previous owners and/or one or more non-owner users, that may receive at least one transaction (e.g., a payment transaction) from a subsequent owner, as elaborated herein. |

Reference is now made to FIG. 1, which is a block diagram depicting a computing device, which may be included within an embodiment of a system for transferring, or managing transferal of data representing one or more transactions between computing nodes of a computer network (typically, in a sense, between the users or parties controlling, owning, or using the nodes for transactions), according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may manage transferal of data representing one or more transactions between computing nodes of a computer network as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to one or more elements of a computer network may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Traditional methods of management of life cycle of a product, from a view point of a merchant may include, for example, buying the product from a supplier, stocking the product, optionally adding value to the product and eventually selling the product at a markup price to a customer or to another merchant. As known in the art, if the sale transaction is performed by a payment instrument such as a credit card, the merchant will need to communicate (e.g., via a proprietary computing device) with an intermediary computing device associated with the payment instrument (e.g., an issuer server) and inform the intermediary computing device of the required payment (e.g., a price of the product). In such a configuration, the intermediary computing device may be oblivious to the chain of suppliers and merchants that may have preceded the sale, as such technology cannot track such information. In other words, a customer who may buy the product from a merchant may not be aware of a supply chain of the product due to the technological limitations. The product may be sold from a first owner (e.g., a producer) to a second owner (e.g., a wholesale distributor), a third owner (e.g., a retailer), a fourth owner (e.g., a consumer), etc. At each stage the respective owner has complete ownership over the product, thus assuming all the risks (e.g., inventory maintenance, price and currency fluctuation, etc.) and rewards (e.g., profit) associated with the product.

Additional methods of management of life cycle of a product may incorporate implementation of contracts among owners (e.g., previous owners and current owners) of a product. For example, in consignment sales, a seller may have a contract (e.g., a smart contract, as known in the art) with a reseller, according to which the seller may send goods to the reseller who may, in turn, pay the seller a predefined percentage or sum only when the goods are sold. However, long chains of owners having complex contractual relations may require each owner in the chain to resolve the contractual agreement with a preceding owner, resulting in a sequential regressive effort to perform payment among owners, which may prove to be impractical to for commercially available payment systems.

Embodiments of the invention may include an alternative approach to traditional product cycle management. This approach may include resolution of payment contracts among a plurality of target user entities, for example integrating prior technology with innovative data structures, block chain technology, and uses of encryption keys, splitting payments according to the resolution and performing payment transactions to one or more (e.g., all) target user entities (e.g., owners and/or non-owner users) in a product chain substantially concurrently, as elaborated herein.

Figure 2:
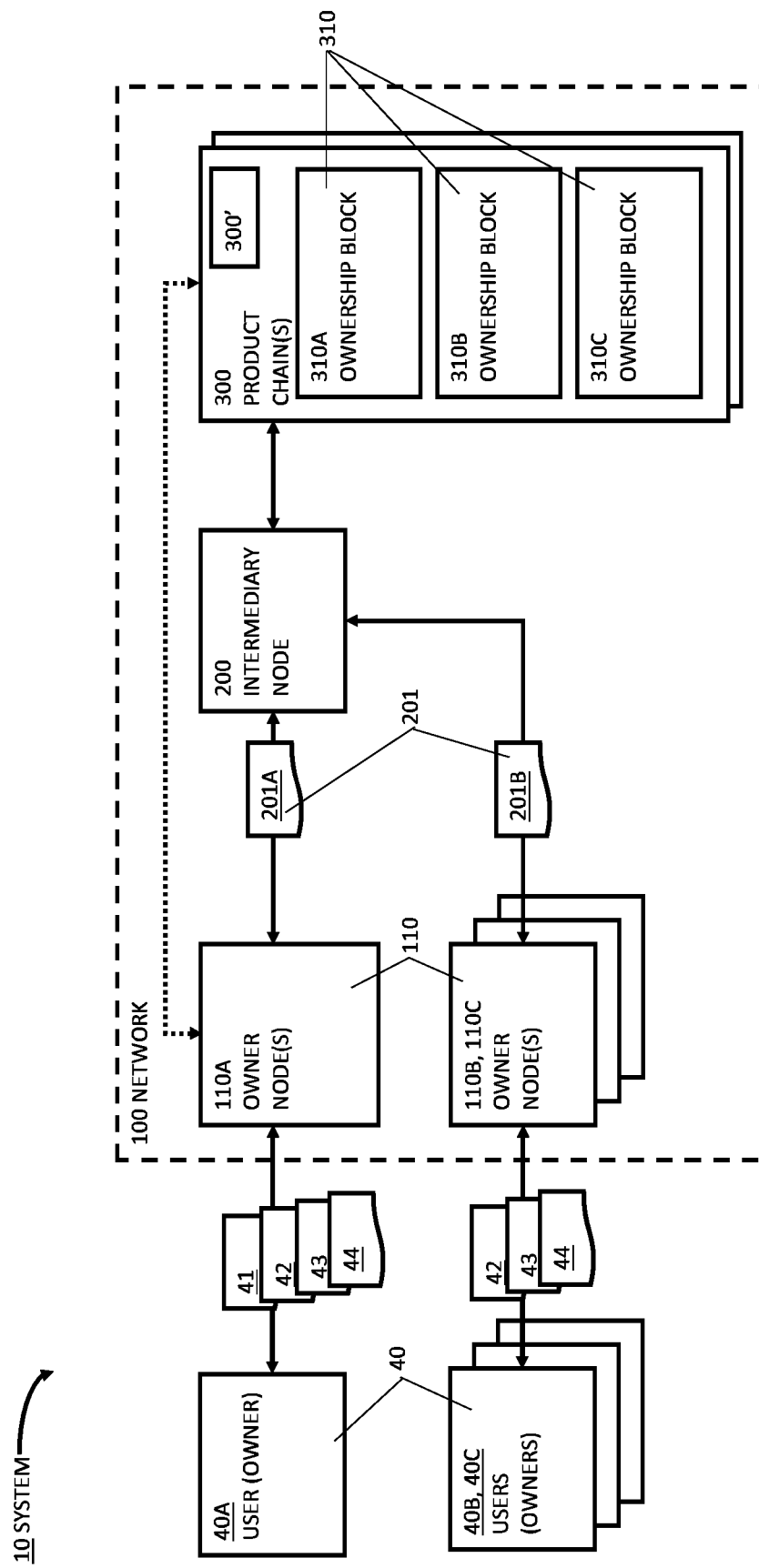
FIG. 2 is a simplified block diagram, depicting a system for transferring, or managing transferal of data representing one or more transactions between computing nodes of a computer network according to some embodiments.

Reference is now made to FIG. 2 that is a simplified block diagram, depicting a system 10 for transferring, or managing transferal of data representing one or more transactions between computing nodes of a computer network according to some embodiments.

As shown in FIG. 2, system 10 may include a computing node such as intermediary node 200. Intermediary node 200 may be or may include a computing device such as computing device element 1 of FIG. 1 and may be communicatively connected to one or more computing nodes (e.g., owner nodes 110, such as 110A, 110B) of computer network 100.

As shown in FIG. 2, embodiments of the present invention may include one or more product chain 300 elements. The one or more product chain 300 elements may be or may respectively include a distributed block chain data element.

As known in the art, the term "block chain" may refer herein to a data structure including distributed list or ledger of linked data blocks, and technology for handling such a data structure. The list may be accessible, at a certain level (e.g., for reading) by a plurality of entities (e.g., users and/or a user computing devices). Each data block may be associated with an entity and may include encrypted information pertaining to a previous block. Each block may also include data pertaining to transactions between such entities (e.g., between one user and another user).

As elaborated herein, the one or more product chain elements 300 may be adapted to maintain a time-wise record of ownership of one or more respective products among one or more users.

According to some embodiments, intermediary node 200 may include one or more distributed block chain data element such as product chain 300. Additionally, or alternatively, product chain 300 may be or may be associated with intermediary node 200 via any appropriate communication protocol. Additionally, or alternatively, product chain 300 may be included in or implemented as a distributed block chain by one or more computing devices (e.g., element 1 of FIG. 1) or nodes of computer network 100 that may be associated with or communicatively connected (e.g., via a computer network connection such as the internet) to intermediary node 200.

According to some embodiments, product chain 300 may be communicatively connected, by any appropriate computer communication protocol (e.g., the internet) to a plurality of computing devices or nodes of computer network 100 such as intermediary node 200 and/or owner nodes 110 (e.g., 110A, 110B). Through this communicative connection, product chain 300 may be read-accessible (e.g., enable reading of data therefrom) to a plurality of computing devices such as one or more owner nodes 110 and/or one or more intermediary nodes 200. However, as elaborated herein, product chain 300 may be write-accessible (e.g., so as to enable changing, adding or overwriting of data therein) only to a specific owner node associated with a current owner of the product of product chain 300, either directly (e.g., as shown by the dotted arrow of FIG. 2) or via intermediary node 200.

The following scenario may be considered as a non-limiting example for managing transferal of data representing one or more transactions (e.g., ME transactions) between computing nodes (e.g., owner nodes 110) of computer network 100 by system 10:

A first user 40 (e.g., 40A, a carpenter), associated with a first owner node 110 (e.g., 110A) may produce or obtain a product (e.g., a chair). First user 40 may communicate with intermediary node 200 and may produce an initial request 41 creation of a product chain 300 pertaining to the product (e.g., the produced chair). Product chain 300 may be a distributed block chain data element and may include one or more ownership blocks. Pertaining to the same example, at this stage, the chair's product chain 300 may include a single, first ownership block 310A that may attribute current ownership to an original owner (e.g., the carpenter). According to some embodiments, initial request 41 may include a public key (e.g., a public encryption key) that may be associated with first user 40 (e.g., 40A, the carpenter).

According to some embodiments, ownership blocks 310 (e.g., first ownership block 310A) may include, for example, one or more data elements pertaining to or describing: an identification of an owner of the product (e.g., an identification number of user 40A); a method of payment of the owner (e.g., a bank account to which user 40A may be paid); an identification of at least one computing device associated with the owner (e.g., a computing device such as 110A that may be owned by user 40A, a banking server or an acquirer server where a bank account of the owner is handled, an issuer server associated with issuance of a paying card of the owner, and the like); a type of the owner (e.g., elements 313 of FIG. 3, such as a producer, supplier, merchant, consumer, etc.); and/or one or more first contract elements pertaining to transfer of ownership between the owner and another owner in the product chain (e.g., the carpenter requires to receive a price of $15 for the chair in the event that the chair is sold to a consumer).

Additionally, ownership blocks 310 may include data elements pertaining to other users that may not be owners (e.g., "non-owner" entities). Thus ownership blocks 310 may associate between the owner (e.g., the carpenter) and such other users (e.g., a supplier of wood, a delivery person, etc.) and their respective computing devices. For example, ownership blocks 310 may include an identification of at least one computing device associated with non-owner user (e.g., a wood supplier, a delivery person), and one or more second contract elements pertaining to transfer of ownership between the owner and the non-owner users (e.g., the wood supplier requires $2 and the a delivery person requires $3 in the event that the chair is sold to a consumer).

A second user (e.g., 40B, a merchant or seller that may be associated with computing node 110B) may require the product (e.g., to sell in a furniture store). The second user 40B may present credentials of a payment instrument (e.g., their credit card number) to the current owner 40A.

The current owner 40A (e.g., the carpenter) may produce data representing a transaction request 42, e.g., to transfer ownership of the product (e.g., the chair) to a second, subsequent owner (e.g., 40B, a seller).

According to some embodiments, the current owner (e.g., carpenter 40A, the current owner of the product) may transfer or transmit (e.g., from owner node 110A via computer network 100) data representing a transaction request 42 to intermediary node 200, and intermediary node 200 may receive data representing a transaction request 42 and process the request as elaborated herein. In alternative embodiments, the current owner (e.g., carpenter 40A) may access product chain 300 and may process the request by itself (e.g., without involving intermediary node 200), as elaborated herein.

According to some embodiments, transaction request 42 may include a public key (e.g., a public encryption key) of a subsequent owner and may be signed by a private key (e.g., a private encryption key) of the current owner. For example, as known in the art, credentials of a payment instrument (e.g., a credit card number) may include a public encryption key that may be associated (e.g., through an issuer of the credit card) to the owner of the payment instrument. Pertaining to the example of the chair, user node 40A (associated with the carpenter) may produce data representing a transaction request 42 that may include the presented credit card number (e.g., the public encryption key) of the subsequent owner (e.g., the seller), and may sign the transaction with their own private encryption key.

According to some embodiments, the data representing transaction request 42 may further include, for example, one or more of: an identification of the product chain 300 associated with the product; a price (e.g., a price that may be transferred during the current transfer of ownership, e.g., between the carpenter and the seller); and an identification of a payment instrument (e.g., a credit card number) associated with the subsequent owner (e.g., 40B, the seller).

According to some embodiments, transaction request 42 may pertain to a single product. Additionally, or alternatively, transaction request 42 may pertain to a plurality of products (e.g., a set of furniture elements) that may be handled by a single product chain 300 (e.g., providing a separate ownership account to the different furniture elements included in the set).

Additionally, or alternatively, transaction request 42 may pertain to a plurality of products (e.g., product bought in a supermarket), and may include, for example: an identification of a respective plurality of product chains 300 associated with the respective products (e.g., a first product chain for dairy products, a second product chain for bread, etc.) and/or a plurality of prices associated with the respective plurality of products. The plurality of product chains 300 may respectively handle transferal of ownership according to parameters specific to each of the plurality of products (e.g., according to respective prices, contract data elements etc.) as elaborated herein.

For the purpose of clarity, embodiments of the invention are explained herein in relation to transaction requests that pertain to a single product. However, it may be clear to a person skilled in the art that proper adjustments may be made to include transaction requests and/or product chains that may pertain to any combination and/or number of products.

According to some embodiments of the invention, intermediary node 200 may authenticate the signature of the current owner 40 (e.g., carpenter 40A), according to a public key of the current owner (e.g., the public key included in initial request 41) and may subsequently access at least one product chain 300 (e.g., to perform reading therefrom and/or writing thereto), respectively associated with the at least one product (e.g., the chair). Additionally, or alternatively, intermediary node 200 may provide a token to the current owner 40 (e.g., carpenter 40A) so as to enable the current owner 40 to directly (e.g., not via intermediary node 200) access the at least one product chain 300.

According to some embodiments of the invention, intermediary node 200 may extract from the at least one product chain at least one list of target user entities and/or at least one corresponding contract data element.

For example, as elaborated herein, embodiments of the invention may enable transfer of ownership that may or may not include payment. Pertaining to the example of the chair product, the first extracted contract data element may include a price and a payment condition. In this example, the extracted list of target user entities may include at least the current owner (e.g., the carpenter) and the extracted contract data may determine that the current owner (e.g., 40A, the carpenter) is to be paid a specific sum of money in a specific currency (e.g., a price of $15) upon occurrence of a specific condition (e.g., sale of the chair to a consumer).

Pertaining to the same example, the current transferal of ownership (e.g., from carpenter 40A to seller 40B) may not require direct payment from subsequent owner 40B (e.g., the seller) to current owner 40A (e.g., the carpenter), because the condition included in the extracted contract data element is not met (e.g., the subsequent owner is not a consumer). Therefore, the data representing transaction request 42 may include a price that is null (e.g., $0).

According to some embodiments, intermediary node 200 may subsequently transmit or perform data representing one or more transactions 201 (e.g., 201A, 201B) between intermediary node 200 and one or more relevant computing nodes (e.g., 40A, 40B) that may be respectively associated with one or more target user entities (e.g., of the at least one list of target user entities) and the subsequent owner (e.g., seller 40B), based on the transaction request 42.

Pertaining to the same example, as the data representing transaction request 42 may include a price that is null, the one or more transactions 201 may be or may include data representing transactions of notification. In other words, intermediary node 200 may provide data elements that are notifications 201 pertaining to transfer of ownership from the current owner (e.g., 40A) to the subsequent owner (e.g., 40B).

Additionally, or alternatively, in a condition where the data representing transaction request 42 includes a price that is not null as elaborated herein, intermediary node 200 may subsequently transmit or perform data pertaining to one or more ME transactions 201 (e.g., 201A, 201B) between intermediary node 200 and one or more relevant computing nodes (e.g., 110A, 110B).

For example, computing nodes 110 (e.g., 110A, 110B) may be issuer servers and/or acquirer servers and may be respectively associated with one or more target user entities (e.g., of the at least one list of target user entities, such as current owner 40A) and the subsequent owner (e.g., seller 40B). Intermediary node 200 may transmit data describing or representing an ME transaction 201 to the one or more computing nodes 110 (e.g., issuer servers and/or acquirer servers), to perform the ME transaction among the respective entities. For example, the ME transaction may include transferal of funds from a subsequent (now current) owner's bank account to a plurality of bank accounts, respectively pertaining to the current (now previous) owner and additional target user entities (e.g., additional previous owners and non-owner users).

According to some embodiments, intermediary node 200 may produce a new ownership block 310B that may include an identification of the subsequent owner (e.g., 40B, the seller) and may append the new ownership block to the respective product chain 300 (e.g., as in a data structure of a linked list or a relational database), to indicate transfer of ownership from the current owner (e.g., 40A, the carpenter) to the subsequent owner (e.g., 40B, the seller). Thus, the current owner (e.g., 40A) may become a previous owner, and the subsequent owner (e.g., 40B) may become a new current owner. It may be appreciated by a person skilled in the art that the entitlement to write-access product chain 300 may thus be transferred from the previous owner (e.g., 40A) to the new current owner (e.g., 40B). For example, owner 40B may now be entitled to append ownership blocks to product chain 300 (e.g., so as to transfer ownership to a new owner, pending authentication by intermediary node 200), whereas owner 40A may be denied such permission.

According to some embodiments of the invention, each product chain element 300 may be associated with a product chain identification data element 300' such as an identification number, identification string and the like.

According to some embodiments, intermediary node 200 may inform the value of identification data element 300' to at least one owner 40 of a respective product. For example, in a first iteration (e.g., creation of product chain 300 by the first owner, e.g., the carpenter) intermediary node 200 may inform identification 300' to first owner 40A as a response to request 41. In another example, in a second iteration (e.g., transferal of ownership from a first owner such as the carpenter 40A to second owner such as the seller 40B), intermediary node 200 may inform identification 300' to the second owner 40B in response to transaction request 42.

According to some embodiments, a current owner (e.g., 40A) may create from identification 300' a unique, secret ownership code 43 that may be associated with the current owner, as elaborated herein. When transferring ownership to a subsequent owner, current owner (e.g., 40A) may produce data representing a transaction request 42 that may include secret ownership code 43. Intermediary node 200 may analyze ownership code 43 and may access and/or enable accessing of the respective at least one product chain 300 (e.g., so as to append a new ownership block to product chain 300) based on this analysis, as elaborated herein.

For example, a first user 40A may own or may be associated with a pair of encryption keys, such as a public encryption key and a private encryption key, as known in the art. In a first iteration (in which first owner 40A is the current owner), first owner 40A may send their public encryption key to intermediary node 200 (e.g., as part of request 41). As elaborated herein, intermediary node 200 may create a product chain 300 having a first ownership block 310A and an identification data element 300' (e.g., an identification number). Intermediary node 200 may inform identification 300' to first owner 40A as a response to request 41. The current owner (e.g., 40A) may produce or calculate ownership code 43 as a function (e.g., a hash function) of the identification data element 300' of product chain 300 and/or their own (e.g., the first owner's) private key.

In a subsequent transferal of ownership, intermediary node 200 may authenticate transaction request 42 in relation to ownership code 43, using the asymmetric encryption keys (e.g., public key, private key) to ensure that transferal of ownership (e.g., creation of a new ownership block and appending thereof to product chain 300) is indeed performed by the current owner 40A.

For example, in the event of ownership transferal from the current owner (e.g., first owner 40A, such as the carpenter) to a subsequent owner (e.g., second owner 40B, such as the seller), the current (e.g., first) owner 40A may include first ownership code 43 in the data representing transaction request 42. Current owner 40A may sign transaction request 42 with their private encryption key, and intermediary node 200 may authenticate the current owner's 40A signature using the current owner's public key, so as to verify that the data representing transaction request 42 was sent by current owner 40A.

According to some embodiments, intermediary node 200 may then analyze ownership code 43 using the current owner's public key to extract the identification 300' of the at least one product chain 300 from ownership code 43. Intermediary node 200 may thus be configured to identify and/or access the at least one product chain 300 according to the extracted product chain identification 300'.

As known in the art, asymmetric encryption keys may be used for signing a message on a first side of a communication and obtaining the identity of the signee on a second side. This process is normally referred to as authentication of the signature. According to some embodiments, intermediary node 200 may further compare the identity of the signee of the data representing transaction request 42 with data included in product chain 300 to verify that the sender of transaction request 42 is indeed the current owner, and handle transaction request 42 accordingly (e.g., handle request 42 as elaborated herein if the verification is successful and refrain from handling request 42 if otherwise).

For example, intermediary node 200 may read at least one data element of the last ownership block 310 of product chain 300, to obtain the identity of the last owner (e.g., the current owner) registered on product chain 300. Intermediary node 200 may compare or match the read data element (e.g., an identity of the last registered owner) with the identity of the signee of the data representing transaction request 42 (e.g., the authenticated current owner) to verify that the authenticated owner 40A is indeed the last registered owner on product chain 300. Additionally, or alternatively, product chain 300 may be implemented as a distributed block chain data element. For example, product chain 300 may be implemented on one or more computing devices (e.g., element 1 of FIG. 1) separate or different than that of intermediary node 200. In such an implementation, intermediary node 200 may propagate or transmit the data representing transaction request 42 to one or more computing devices of the distributed block chain (e.g., product chain 300). Product chain 300 may authenticate the identity of the current owner (e.g., 40A) as the last registered owner on the distributed block chain (e.g., product chain 300).

Intermediary node 200 may thus be configured or allowed to perform transferal of ownership among owners according to the content of transaction request 42 (e.g., from 40A to 40B). Intermediary node 200 create a new ownership block 310B pertaining to the subsequent owner (e.g., 40B) and append the new ownership block 310B to product chain 300 so as to represent transferal of ownership to the subsequent owner (e.g., seller user, 40B). Additionally, or alternatively, in an implementation in which product chain 300 is a distributed block chain data element, intermediary node 200 may propagate or transmit the data representing transaction request 42 to one or more computing devices of the distributed block chain (e.g., product chain 300). Product chain 300 may subsequently create a new ownership block 310B pertaining to subsequent owner 40B, based on the verification of identity (as elaborated above) and append the new ownership block 310B to product chain 300, to represent transfer ownership to subsequent owner 40B.

Thus, as explained herein, only a current owner may be able transfer (e.g., via their respective computing device 40A) ownership to a subsequent owner 40B. In other words, in the configuration elaborated herein, intermediary node 200 may not be able to independently (e.g., without receiving ownership code 43) access the relevant product chain 300 and/or append a new ownership block 310 onto product chain 300 and may thus not be able to transfer ownership from a current owner to subsequent owners.

According to some embodiments, a subsequent owner (e.g., 40B) may own or may be associated with a pair of encryption keys, such as a public encryption key and a private encryption key, as known in the art. In a first iteration of transfer of ownership, a current owner (e.g., 40A) may receive the public key of the subsequent owner and send the subsequent owner's 40B public key (e.g., as part of transaction request 42) to intermediary node 200.

For example, subsequent owner 40B may present a paying instrument (e.g., a credit card) to the current owner 40A. As known in the art, an identification of a paying instrument (e.g., a credit card number) may be, or may include a public key associated with the owner of the paying instrument. Therefore, in the first iteration of transfer of ownership, the current owner (e.g., 40A) may send (e.g., as part of transaction request 42) an identification of the paying instrument of the subsequent owner 40B to intermediary node 200. In embodiments where product chain 300 is implemented as a distributed block chain, intermediary node 200 may propagate or transmit the data representing transaction request 42 (e.g., with the public key of owner 40B) to the one or more computing devices (e.g., element 1 of FIG. 1) of the distributed block chain (e.g., of product chain 300).

According to some embodiments, the one or more computing devices of product chain 300 may send or communicate (e.g., via intermediary node 200) a product chain identification 300' to subsequent owner 40B (e.g., in response to transaction request 42 and/or as part of a transaction 210B (e.g., following transferal of ownership from 40A to 40B)). The one or more computing devices of product chain 300 may transfer ownership from the current owner (e.g., 40A) to the subsequent owner (e.g., 40B), as elaborated above. In a subsequent, second iteration, only the now current owner (e.g., seller 40B) may be able to perform transferal of ownership:

For example, the now current owner (e.g., 40B) may produce a second ownership code 43 (e.g., as a function of their private key and product chain identification 300', as elaborated above). The now current owner 40B may send a second transaction request 42 to transfer ownership to yet another owner (e.g., 40C), and may include the second ownership code 43 in transaction request 42. The now current owner 40B may sign transaction request 42 with their private encryption key. As explained above, intermediary node 200 may already have a public key of the now current owner 40B (e.g., from transaction request 42 of the first iteration). Intermediary node 200 may receive the data representing second transaction request 42 (e.g., including the second ownership code 43 of the now current owner 40B) and may authenticate the signature of the now current owner 40B using owner's 40B public encryption key, to authenticate the signature of the now current owner and verify that it was indeed sent by the current owner (e.g., 40B).

Intermediary node 200 may handle the second transaction request 42 in a similar manner to that described above (e.g., in relation to the first transaction request 42). For example, in an implementation in which product chain 300 is implemented as a distributed bock chain, intermediary node 200 may extract the product chain identification 300' from the second ownership code 43 and propagate the data representing transaction request 42 to the one or more computing devices 1 of the distributed bock chain (e.g., product chain 300). The one or more computing devices 1 of product chain 300 may (a) read at least one data element of the last ownership block 310 of product chain 300, to obtain the identity of the current owner of the respective product; (b) verify the identity of the now current owner (e.g., 40B) based on the new ownership code 43; (c) produce a new ownership block (e.g., 310C) for the new subsequent owner (e.g., 40C) based on the new ownership code 43 (e.g., based on the verification of the identity of current owner 40B according to new ownership code 43); and (d) append the newly created ownership block (e.g., 310C) to product chain 300, thus transferring or representing a transfer of ownership from the current owner (e.g., 40B) to the subsequent (now current) owner (e.g., 40C).

Figure 3:
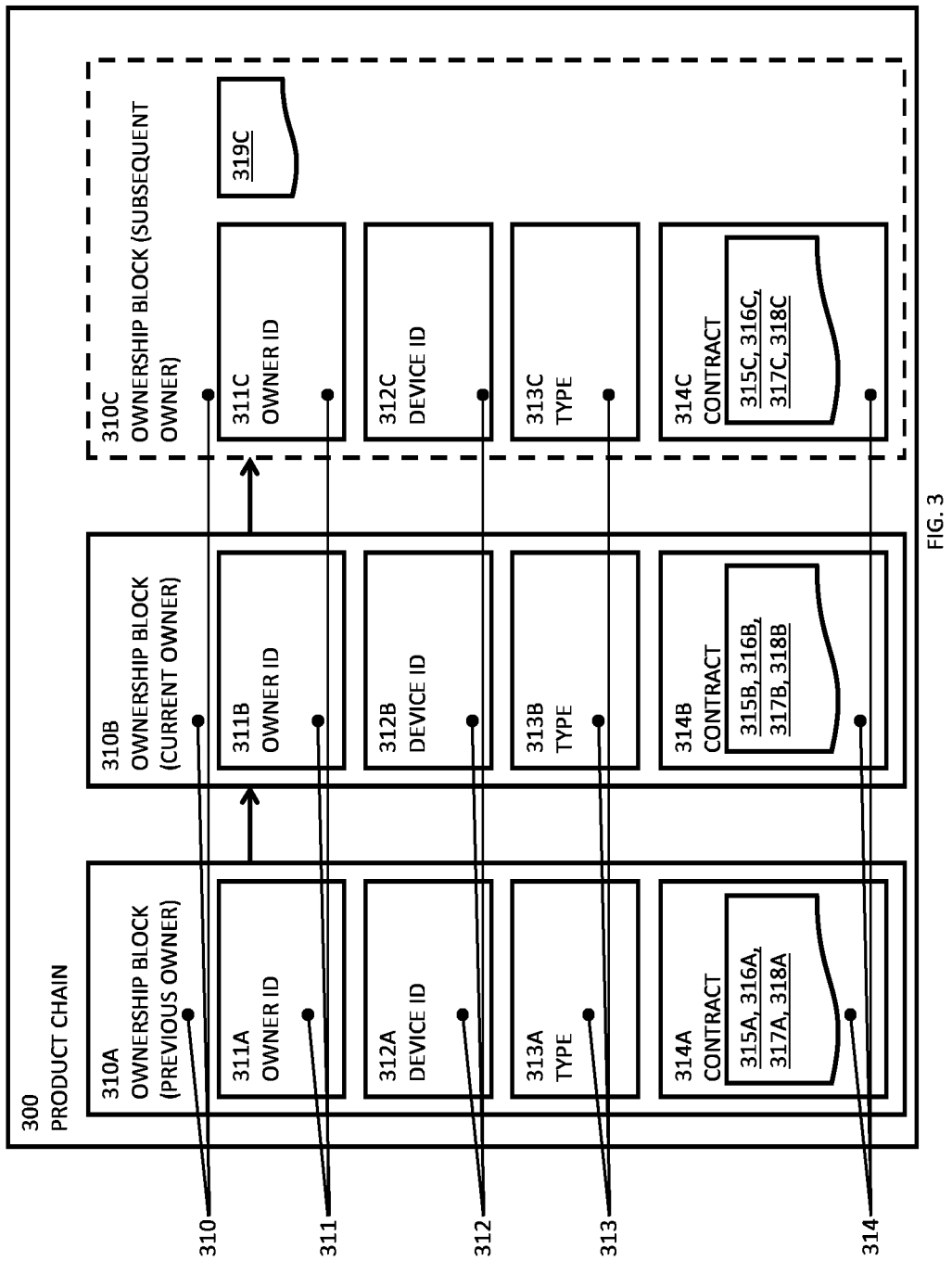
FIG. 3 is a simplified block diagram, depicting an example of a product chain that may be included in a system for transferring, or managing transferal of data representing one or more transactions between computing nodes of a computer network, according to some embodiments.

Reference is now made to FIG. 3 which is a simplified block diagram, depicting an example of a product chain 300 that may be included in a system for transferring or managing transferal of data describing one or more transactions between computing nodes of a computer network, according to some embodiments.

According to some embodiments of the invention, product chain 300 may be or may include a distributed (e.g., among one or more interconnected computing devices such as element 1 of FIG. 1) block chain data element, as known in the art.

As shown in the example of FIG. 3, product chain 300 may include one or more ownership blocks 310 (e.g., 310A, 310B, 310C), each corresponding to a specific owner of one or more respective products.

According to some embodiments, one or more ownership blocks 310 may include an owner identification 311 (e.g., 311A, 311B, 311C, such as an identification number, and identification string and the like), corresponding to a specific owner of the relevant at least one product (e.g., the chair) registered in product chain 300.

Additionally, or alternatively, one or more ownership blocks 310 may include an identification 312 (e.g., 312A, 312B, 312C of a specific computing device) such as an owner computing device (e.g., element 40 of FIG. 2) and/or owner node (e.g., element 110 of FIG. 2).

According to some embodiments, one or more ownership blocks 310 may include an owner type element 313 (e.g., 313A, 313B, 313C) that may associate a specific type of an owner (e.g., a producer, supplier, merchant, consumer, etc.) to a specific owner.

For example, ownership block 310A may correspond to a previous owner, who may have been attributed ownership of the product at a previous point in time. Pertaining to the example of the chair, after transferring ownership from a first owner (e.g., the carpenter) to a second, subsequent owner (e.g., the seller), the ownership block 310A may correspond to the previous owner (e.g., the carpenter). In this example, owner type 313A may be that of a "producer". Ownership block 310A may include an owner identification 311A corresponding to the first owner (e.g., their identification number). Additionally, or alternatively, ownership block 310A may include a computing device identification 312 (e.g., 312A) that may be associated with a computing device (e.g., element 1 of FIG. 1) that corresponds to the respective owner. For example, device identification 312 may include an identification or an address (e.g., an internet protocol address) corresponding to a computing device belonging to the previous user (e.g., 40A). Additionally, or alternatively, device identification 312 may include an identification or an address of an owner node (e.g., element 110A of FIG. 2) such as a banking server where the previous owner's (e.g., the carpenter's) banking account may be handled.

In another example, ownership block 310B may correspond to a current owner, who may be presently attributed ownership of the product. Pertaining to the example of the chair, after transferring ownership to the subsequent owner (e.g., the seller), the subsequent owner may become the current owner, and may be represented in product chain 300 by ownership block 310B (e.g., of the current owner, corresponding to computing devices 40B and/or 110B).

In yet another example, ownership block 310C may correspond to a subsequent owner, who may be attributed ownership of the product (e.g., to become a "current owner") at a future point in time, e.g., following an iteration of a process of transferal of ownership from the current owner to the subsequent owner. Pertaining to the example of the chair, in a subsequent iteration in which ownership may be transferred from a first, current owner (e.g., 40B, the seller) to a second, subsequent owner (e.g., 40C, such as a consumer), embodiments of the invention may enable the current owner to produce ownership block 310C of the subsequent owner 40C. Embodiments of the invention may then append the newly created ownership block 310C to product chain 300 following verification and/or resolution of one or more contract elements 314 (e.g., 314C) in relation to one or more owners registered in product chain 300, as elaborated herein.

As shown in FIG. 3, ownership block 310 (e.g., 310A, 310B, 310C) may include one or more contract data elements 314 (e.g., 314A, 314B, 314C), pertaining to transfer of ownership between an owner and at least one other owner in the product chain, as elaborated herein. Intermediary node 200 may receive the one or more contract data elements 314 from respective owners 40 (e.g., as part of request 41 and/or transaction request 42). Intermediary node 200 may include the one or more contract data elements 314 in respective ownership blocks 310. Intermediary node 200 may subsequently extract from product chain 300 (e.g., from one or more ownership blocks) one or more identities 311 of previous owners of the product and one or more contract data elements 314 to perform resolution of a transfer of ownership and/or sale of a product associated with product chain 300.

For example, contract element 314 may include a definition of a contract relation 315 (e.g., 315A, 315B, 315C) that may define a relation among two or more user entities (e.g., owners and/or non-owners). According to some embodiments, contract relation definition 315 may be defined by or specifically in relation to each user's type 313 (e.g., 313A, 313B, 313C)) as elaborated herein.

For example, contract relation definition 315 may include one or more of: a price corresponding to a specific product or group of products, terms of payment such as timing, deferral of payment and number of payments, currency used for payment, etc. The price may be presented, for example as a percentage of an eventual sale of the product, a number, representing a predefined sum of money and any combination thereof.

Pertaining to the example of the chair: a first user (e.g., first owner 40A) may include in their respective owner block (e.g., 310A) a first contract element (e.g., 314A) that is a first contract relation definition (e.g., 315A). The first contract relation definition 315A may dictate, for example, that they should be paid 40% of an eventual sale of a chair to a consumer (e.g., an owner whose owner type 313 is a 'consumer'). A second user (e.g., a second owner 40B) may include in their respective owner block (e.g., 310B) a second contract element (e.g., 314B) that is a second contract relation definition (e.g., 315B). The second contract relation definition 315B may dictate, for example, that second owner 40B should also be paid 40% of an eventual sale of a chair to a consumer.

Additionally, or alternatively, contract element 314 may include an identification 318 (e.g., 318A, 318B, 318C) of at least one non-owner entity and a definition of a contract relation 315 (e.g., 315A, 315B, 315C) corresponding to the non-owner entity. Pertaining to the example of the chair, a non-owner entity may be a wood supplier who may have provided wood to the carpenter (hence included in the carpenter's ownership block 310A). Non-owner identification 318 (e.g., 318A) may be an identification (e.g., an identification number) of the wood supplier, and the corresponding contract relation 315 (e.g., 315A) may dictate that the wood supplier should be paid 10% of an eventual sale of a chair to a consumer.

In this condition, in currently available systems of commerce, a subsequent owner (e.g., 40C) may not be able to demand more than 10% of the eventual sale price because 40+40+10=90. In other word, a subsequent owner that is a retail merchant may not define a contract relation definition (e.g., 315C) that would dictate a share of 30% of the eventual sale price, because 40%+40%+10%+30%=120% (>100%).

According to some embodiments, intermediary node 200 may be configured to perform resolution of one or more transaction requests 42 (and/or request 41) among one or more target user entities and one or more subsequent owner represented by ownership block 310C) according to the one or more contract data elements. Pertaining to the same example, intermediary node 200 may resolve one or more transaction requests 42 and request 41 among the one or more previous owners (e.g., the carpenter, represented by ownership block 310A one or more non-owner users) the current owner (e.g., the seller represented by ownership block 310B) non-owner entities (e.g., the wood supplier represented in element 318A) and a subsequent owner (e.g., the retail merchant represented by ownership block 310C) according to the one or more contract data elements.

For example, intermediary node 200 may resolve the transaction requests 42 (and/or request 41) according to one or more predefined rules. For example, intermediary node 200 may override the requested contract relation definitions 315 and recalculate each share according to their respective initial ratio. Pertaining to the above example, intermediary node 200 may recalculate the respective shares by dividing each share by 1.2 (=120/100), resulting in a modified split of: [33.3%, 33.3%, 8.3% and 25%].

In another example, intermediary node 200 may override the requested contract relation definitions 315 and recalculate each share according to each owner's type 313, according to a predefined rule e.g., a first percentage to an owner who is a producer a second percentage for an owner who is a wholesale merchant, a third percentage to an owner who is a retail seller and a fourth percentage to a non-owner target user entity (e.g., the wood supplier).

In another example, intermediary node 200 may transmit data representing one or more transactions 201 (e.g., 201A, 201B) to one or more relevant computing nodes (e.g., 110A, 110B, 110C and/or 40A, 40B, 40C), to initiate a process of negotiation among these owners.

According to some embodiments of the invention the one or more contract elements 314 may include a definition of a predefined triggering condition 316 (e.g., 316A, 316B, 316C) and/or a definition of a predefined contract timing condition 317 (e.g., 317A, 317B, 317C). The process of ownership transfer as elaborated herein may be repeated in a plurality of iterations, until a triggering event occurs and meets at least one of the predefined triggering condition 316 and/or predefined contract timing condition 317.

In other words, embodiments of the invention may repeat, until a triggering condition is met, the sequence of: (a) receiving a data representing transaction request 42; (b) extracting identities of previous users, owners and/or contract data elements; (c) authenticating a signature of the current owner; (d) accessing a respective product chain 300; (e) producing a new ownership block based on the received transaction request (e.g., representing transfer of ownership from a first owner to a second owner); and (f) appending the new ownership block to product chain 300, until a triggering event occurs (e.g., until the chair is sold to an end consumer). Subsequently (e.g., in response to occurrence of a trigger event that meets at least one of the trigger condition and contract timing condition), intermediary node 200 may perform resolution of at least one contract data element (e.g., perform arbitration or splitting of a price among users and/or owners) and may subsequently transmit data pertaining to or representing one or more transactions 201 (e.g., ME transactions) to computing nodes (e.g., elements 110 of FIG. 2) associated with the one or more users or owners, to initiate or perform the said transactions (e.g., the ME transactions).

Pertaining to the example of the chair, owner 40C may transfer ownership of the chair to a subsequent owner (e.g., another seller) who may, in turn transfer ownership of the chair to yet another owner, etc. Each of the new owners may append a respective ownership block on product chain 300 to represent transfer of ownership to the following owner. At least one contract element 314 may include a definition of a predefined triggering condition 316 (e.g., 316C) that may dictate that payment among one or more owners and/or users must be resolved when the product (e.g., the chair) is sold to a consumer (e.g., to an owner who's type 313 is that of a consumer). In this example, the triggering event may be the sale of the product to the consumer.

In another example, at least one contract element 314 may include, a definition of a contract timing 317 that may dictate that a payment among one or more owners and/or non-owner users 40 must be resolved when a predefined time has elapsed (e.g., one month after the carpenter has supplied the chair to the seller). In this example, the triggering event may be the elapse of the predefined period.

It may be apparent to a person skilled in the art that embodiments of the invention may include additional triggering events that may be defined according to specific requirements and/or configurations.

As elaborated herein, data representing at least one transaction request 42 may include, inter alia, a price of a product (e.g., the chair) that may be transferred during a transfer of ownership, (e.g., between a consumer and the seller) and an identification of a payment instrument (e.g., a credit card number) associated with the subsequent owner (e.g., 40C, the consumer). Following occurrence of a triggering event (e.g., sale of the chair to a consumer), intermediary node 200 may split the price among one or more target user entities 40, including for example: the current owner (e.g., seller 40B), the one or more previous owners (e.g., carpenter 40A) and one or more previous non-owner users (e.g., the wood supplier, the delivery person), according to the one or more contract data elements. Additionally, or alternatively, intermediary node 200 may split the price to one or more users 40 (e.g., owners, non-owner users) that may be included within one or more ownership blocks in product chain 300.

Pertaining to the example of the chair, a user 40C may buy the chair from seller 40B for $30. User 40C may thus become a 'consumer' type owner 40C of the product, and a predefined triggering condition 316 (e.g., of a sale to a consumer) may be met. Intermediary node 200 may resolve payment among the one or more owners and/or non-owner users 40 and split the price among one or more target user entities 40 (e.g., the current owner, one or more previous owners, one or more non-owner users) according to the one or more contract data elements. For example: (a) a first contract relation definition (e.g., 315A, included in ownership block 310A of a previous owner, such as the carpenter) may dictate that a first non-owner user 40 (e.g., the wood supplier) should receive $2 in the event that the chair is sold to a consumer; (b) a second non-owner user 40 (e.g., a delivery person) should receive $3 in the event that the chair is sold to a consumer; and (c) a previous owner (e.g., 40A, the carpenter) should receive $15 for the chair, in the event that the chair is sold to a consumer. A second contract relation definition (e.g., 315B included in ownership block 310B of a current owner such as the seller) may dictate that the seller is entitled to 100% of the remaining operating profit (e.g., 50−(2+3+15)=$30). In this example, intermediary node 200 may split the payment among the plurality of target user entities, so as to pay the seller $30, the carpenter $15, the delivery person $3 and the wood supplier $2.

As elaborated herein in relation to resolving of transaction requests, embodiments of the invention may provide resolution of conflicting contract relation definitions pertaining to payment. Pertaining to the same example, second contract relation definition (e.g., 315B) may dictate that the seller is entitled to 100% of the remaining operating profit, and not less than $40. In this condition, the payment conditions may be unresolved in view of the one or more contract relation definitions 315. Intermediary node 200 may, for example resolve payment conditions among a plurality of target user entities 40 by overriding one or more contract relation definition 315 and thus resolve payment among the one or more owners and/or non-owner users 40. Alternatively, intermediary node 200 may intervene to disallow the purchase of the product by the consumer according to the current payment conditions. For example, intermediary node 200 may avoid processing payment among one or more computing devices of network 100, to deny sale of a product when payment conditions are unresolved.

Figure 4:
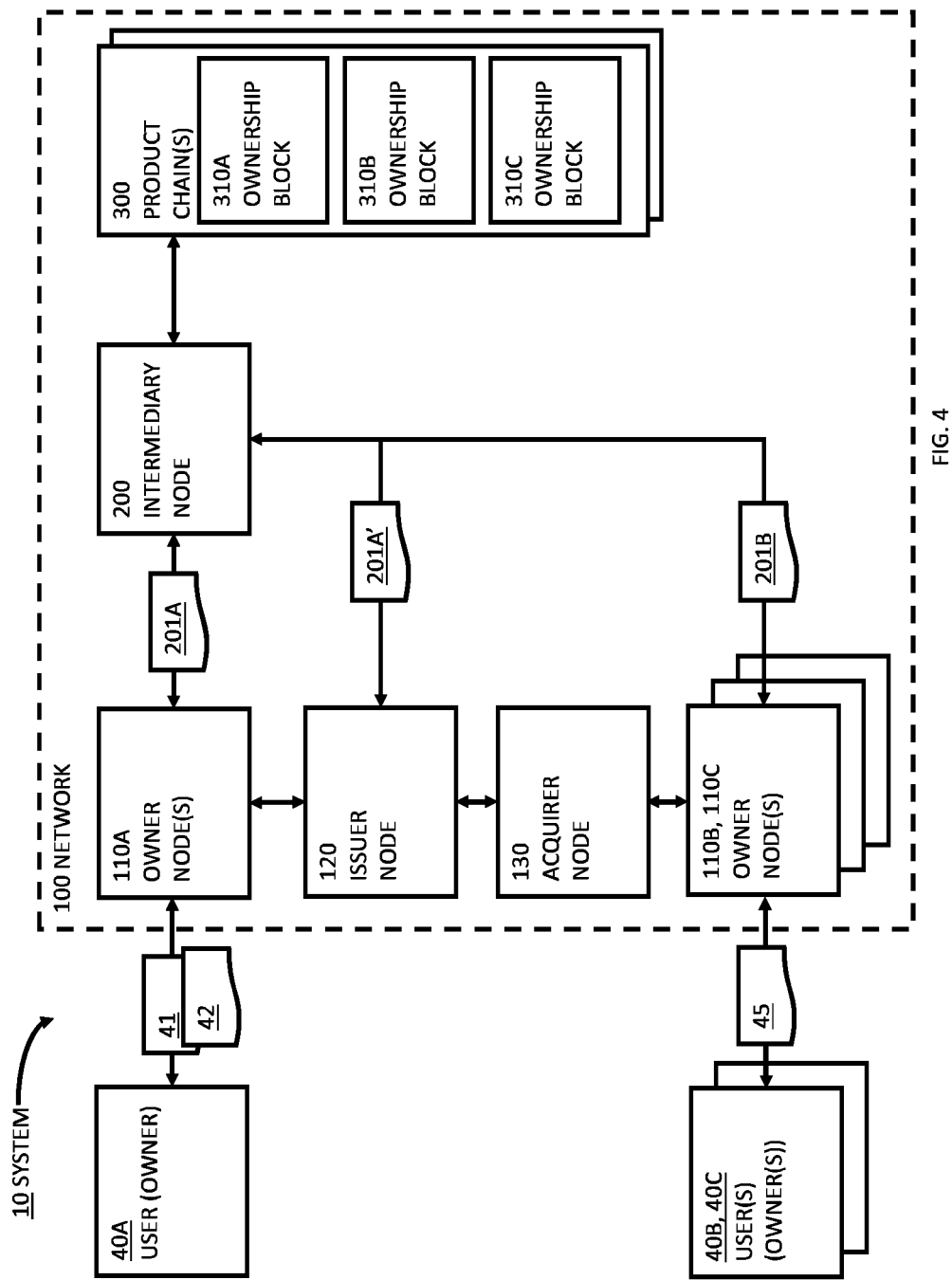
FIG. 4 is a block diagram, depicting an example of a system for manipulating a product chain data structure, to transfer, or manage transferal of data representing one or more transactions such as monetary exchange (ME) transactions between computing nodes of a computer network, according to some embodiments.

Reference is now made to FIG. 4 which is a block diagram, depicting an example of a system for manipulating a product chain data structure, so as to transfer or manage transferal of data describing one or more transactions such as ME transactions between computing nodes of a computer network, according to some embodiments.

As elaborated herein (e.g., in relation to FIG. 3), data representing transaction request 42 (e.g., for transferring ownership from a current owner to a subsequent owner, such as a consumer) may include a price of at least one product. Intermediary node 200 may be configured to perform resolution or arbitration of the price among one or more target user entities (e.g., the current owner, one or more previous non-owner users, one or more previous owners of the at least one product) and the subsequent owner according to the one or more contract data elements.

According to some embodiments of the invention, intermediary node 200 may subsequently transmit data representing one or more transactions 201 (e.g., 201A, 201A', 201B), to perform the transactions (e.g., ME transactions, such as payment transactions) among intermediary node 200 and one or more additional computing nodes (e.g., 110A, 110B, 120, 130). The one or more additional computing nodes may be, for example, associated with the one or more previous owners (e.g., 40A, the carpenter), the current owner (e.g., 40B, the seller) and the subsequent owner (e.g., 40C, the consumer, now becoming the new current owner), based on the arbitration.

For example, if the arbitration or resolution of the contract includes modifying a split of payment among the target user entities and subsequent owner (e.g., as elaborated herein, e.g., in relation to FIG. 3) then intermediary node 200 may initiate or perform one or more ME transactions among the one or more target user entities and the subsequent owner, according to the arbitration (e.g., according to the split price). The one or more ME transactions may be performed substantially concurrently.

The term 'concurrently' may be used in this context to indicate that the said ME transactions may be performed substantially at the same time for all practical uses (e.g., within a predefined period of 30 seconds). Additionally, or alternatively, the ME transactions may be referred to as 'concurrent' in a sense that a first payment transaction (e.g., transfer of funds from an end consumer's banking account to a bank account of the wood supplier, at the base of the product chain) may not be dependent upon success of an ME transaction to another entity (e.g., from the consumer's bank account to a retailer's bank account), thus facilitating a scheme of fair, independent trade among different entities involved in the production and selling of the at least one product (e.g., the chair).

According to some embodiments, at least one ME transaction of the one or more ME transactions may be based on an identification or a credential of a paying instrument associated with the subsequent (e.g., now current) owner.

For example, as elaborated herein (e.g., in relation to FIG. 2), a subsequent owner may present a payment instrument credential (e.g., a paying card number) to the current owner. In other words, the public key of the subsequent owner may be or may include an identification of a paying instrument associated with the subsequent owner. This credit card number may be used to obtain the subsequent user's public key for transaction request 42.

According to some embodiments, intermediary node 200 may use the same public key (e.g., credit card number) to perform at least one ME transaction of the one or more ME transactions. For example, intermediary node 200 may contact one or more issuer computing devices 120 (e.g., an issuer of the consumer's credit card), according to the identification of the paying card, to process payment from the consumer's banking account to one or more computing nodes (e.g., banking servers handling banking accounts) of one or more target user entities 40 (such as the seller, the carpenter, the wood supplier and the delivery person), according to their respective split of payment as calculated and/or resolved (e.g., $30, $15, $3 and $2, respectively).

Additionally, or alternatively, intermediary node 200 may act as a banking server and/or as an issuer server, to provide clearance of payment among the one or more computing devices. For example, intermediary node 200 may transfer funds from a bank account of one owner (e.g., 40C, the consumer) and transfer 210 the funds to one or more bank accounts of one or more respective owners (e.g., the carpenter, the seller) and/or non-owner users (e.g., the wood supplier, the delivery person).

According to some embodiments, at least one ownership block (e.g., element 310C of FIG. 3) may include at least one status data element (e.g., element 319C of FIG. 3) pertaining to resolution of a payment. According to some embodiments, intermediary node 200 may be configured to alter or update the at least one status data element (e.g., 319C) of the at least one an ownership block (e.g., 310C) of the subsequent (e.g., the now current) owner, to comprise one or more data elements pertaining to resolution of a payment, including for example an identity of one or more target user entities (e.g., previous owners and/or non-owner users) and a respective amount that has been paid to them.

According to some embodiments, intermediary node 200 may transmit data representing the one or more transactions (e.g., ME transactions) 201, to perform or initiate the respective transactions between intermediary node 200 and one or more computing nodes 110 (e.g., associated with the one or more owners such as previous owner(s) 40A, current owner 40B and subsequent owner 40C) substantially concurrently. The term 'concurrent' may be used in this context to indicate that the transactions may be performed in substantially the same time for any practical aspect user experience.

Additionally, or alternatively, intermediary node 200 may perform one or more transactions 201 at substantially the same time through one or more respective banking systems. This element of concurrency may provide an improvement over prior technology.

For example when processing data representing transactions 201, embodiments of the invention may eliminate dependency of performance of one transaction (e.g., one payment) on successful fulfillment of another transaction (e.g., another payment, down the product chain). Pertaining to the example of the chair, embodiments of the invention may determine that the wood supplier would be paid in real time or near real time, following sale of the chair by a reseller to a consumer. Thus, the wood supplier may directly be provided income following ingress of revenue, without depending on periodic book keeping of subsequent owners of the product.

Moreover, in scenarios where a large number of target user entities and/or products are involved, the element of concurrency may include an additional improvement over prior technology: for example, centrally resolving payment conditions, and distributing the required transactions (e.g., payments) to relevant computing devices (e.g., banking servers) in a parallel manner, as "atomic-level" transactions, may reduce network traffic, and processing time, and may also reduce computational requirements from the recipients of the transactions (e.g., the banking servers).

According to some embodiments, intermediary node 200 may perform or transfer the one or more transactions 201 in response to occurrence of a trigger event that meets at least one of a predefined triggering condition 316 and/or a definition of a contract timing condition 317. For example, intermediary node 200 may transfer the one or more transactions 201 upon a transfer of ownership and a sale of the product to an end-consumer. In another example, intermediary node 200 may transfer the one or more transactions 201 upon lapse of a predefined period from a previous event (e.g., a week after a seller has sold the product to a reseller).

It should be emphasized that in this context, reference to computing nodes (e.g., 110A, 110B, 120, 130) associated with one or more owners may relate to computing devices that may or may not belong to or correspond with the owners themselves.

For example, a computing node (e.g., a terminal computer at a point of sales in a shop of seller 40B) may belong to, or correspond to an owner (e.g., 40B, the seller).

In another example, a computing node (e.g., 110A) may be a computing device (e.g., an issuer server 120 and/or a banking server) that may be associated with a bank account and/or an issuer of a paying instrument (e.g., a credit card) of an owner (e.g., the carpenter).

In another example, a computing node (e.g., 110B) may be a computing device (e.g., an acquirer server 130 and/or a banking server) that may be associated with a bank account of an owner (e.g., a banking account of a merchant, such as the seller).

In yet another example, a computing node (e.g., 110A) may be a computing device (e.g., a banking server) that may be associated with a non-owner user 40. Pertaining to the example of the chair, one or more users 40 (e.g., the wood supplier) may be associated to an owner (e.g., the carpenter) via one or more contract data elements 314 of respective ownership blocks 310 (e.g., the carpenter's owner block). In other words, the owner (e.g., the carpenter) may be associated (e.g., via contract data element 314) to one or more users 40 (e.g., the wood supplier) who may in turn be associated with one or more respective computing devices 110 (e.g., a banking server handling the wood supplier's bank account).

According to some embodiments, following resolution of payment and/or following communication of one or more ME transactions 201 to computing devices 110 of network 100, intermediary node 200 may mark product chain 300 as resolved, indicating that payment to one or more (e.g., all) relevant user entities 40 (e.g., owners and/or non-owner users) has been satisfied. For example, intermediary node 200 may set an indication flag in one or more ownership blocks 310 to indicate that payment requirements for the respective user entities has been satisfied. Additionally, or alternatively, intermediary node 200 may, altered or updated an ownership block 310 of the current owner (e.g., the last appended ownership block 310 of product chain 300) to include one or more data elements pertaining to resolution of payment. For example, the one or more payment resolution data elements may include: an identity of one or more target user entities 40 (e.g., non-owner users and/or owners) who have been paid, a respective payment amount of the one or target user entities 40, and the like. In this condition, intermediary node 200 may be performing resolution of payment among one or more target user entities based on the one or more altered or updated payment resolution data elements. For example, additional iterations of ownership transfers and/or payments may only be resolved and/or split (e.g., as elaborated herein), among computing nodes 110 associated with new owners.

According to some embodiments, during an iteration of ownership transferal between a current owner (e.g., 40A) and a subsequent (e.g., 40A) owner, intermediary node 200 may enable subsequent (e.g., 40A) owner to confirm the transfer. For example, intermediary node 200 may send one or more data elements of the transaction request 42 (e.g., a price of a product, one or more contract data elements and the like) to computing node (e.g., 110B and/or 40B) of the subsequent owner 40B. Subsequent owner 40B may acknowledge and/or respond 45 to the sent data by, for example, sending a confirmation indication from the corresponding computing node (e.g., 110B and/or 40B). Additionally, or alternatively, subsequent owner 40B may refuse to the sent data of the transaction request 42 (e.g., refuse to a suggested price, refuse to a suggested contract data element, etc.). According to some embodiments, intermediary node 200 may thus facilitate negotiation between the current owner 40A and one or more subsequent owners regarding terms of payment, price and/or contract details pertaining to the product.

Intermediary node 200 may analyze the received acknowledgement 45 (e.g., the received confirmation indication) in view of the transaction request 42. For example, intermediary node 200 may compare received acknowledgement 45 (e.g., an accepted price) to data of transaction request 42 (e.g., a suggested price) and may confirm the ownership transferal based on the analysis or comparison. Additionally, or alternatively, intermediary node 200 may facilitate negotiation between current owner 40A and subsequent owner 40B. For example, intermediary node 200 may mediate between one or more data elements (e.g., contract data elements 314) suggested by current owner 40A (e.g., a required percentage of revenue upon sale) and one or more respective data elements (e.g., respective contract data elements 314) acceptable by subsequent owner 40B (e.g., an acceptable percentage of revenue upon sale).

Intermediary node 200 may subsequently transfer ownership by appending a respective ownership block 310 to product chain 300, based on the analysis of the confirmation indication (e.g., pending agreement on terms of the ownership transferal between the current owner and the subsequent owner).

Additionally, intermediary node 200 may transfer data pertaining to the one or more transactions 201 (e.g., ME transactions), between the subsequent (now current) owner 40B and one or more target entities such as: the current (now previous) owner 40A, additional previous owners, non-owner users, etc.

According to some embodiments of the invention, at least one transaction request 42 may pertain to a plurality of products of the current owner 40A. For example, the current owner may be a merchant, such as a supermarket, and data representing transaction request 42 may include a list of products (e.g., bread, milk, honey, etc.) that may be purchased at the supermarket. In this condition, data representing the at least one transaction request 42 may include an identification of a respective plurality of product chains 300, and one or more (e.g., all) of the product chains 300 may be associated with the respective plurality of products (e.g., the bread, milk, honey, etc.). Data representing transaction request 42 may further include a plurality of prices that may be associated with the respective plurality of products. In this condition, embodiments of the invention may perform, by a single transaction request 42 (representing a single purchase of the elements in the shopping list) a resolution of payment, a split of payment transfer of a plurality of ME transactions to a plurality of users and/or owners (current and/or previous) of the plurality of products.

Figure 5:
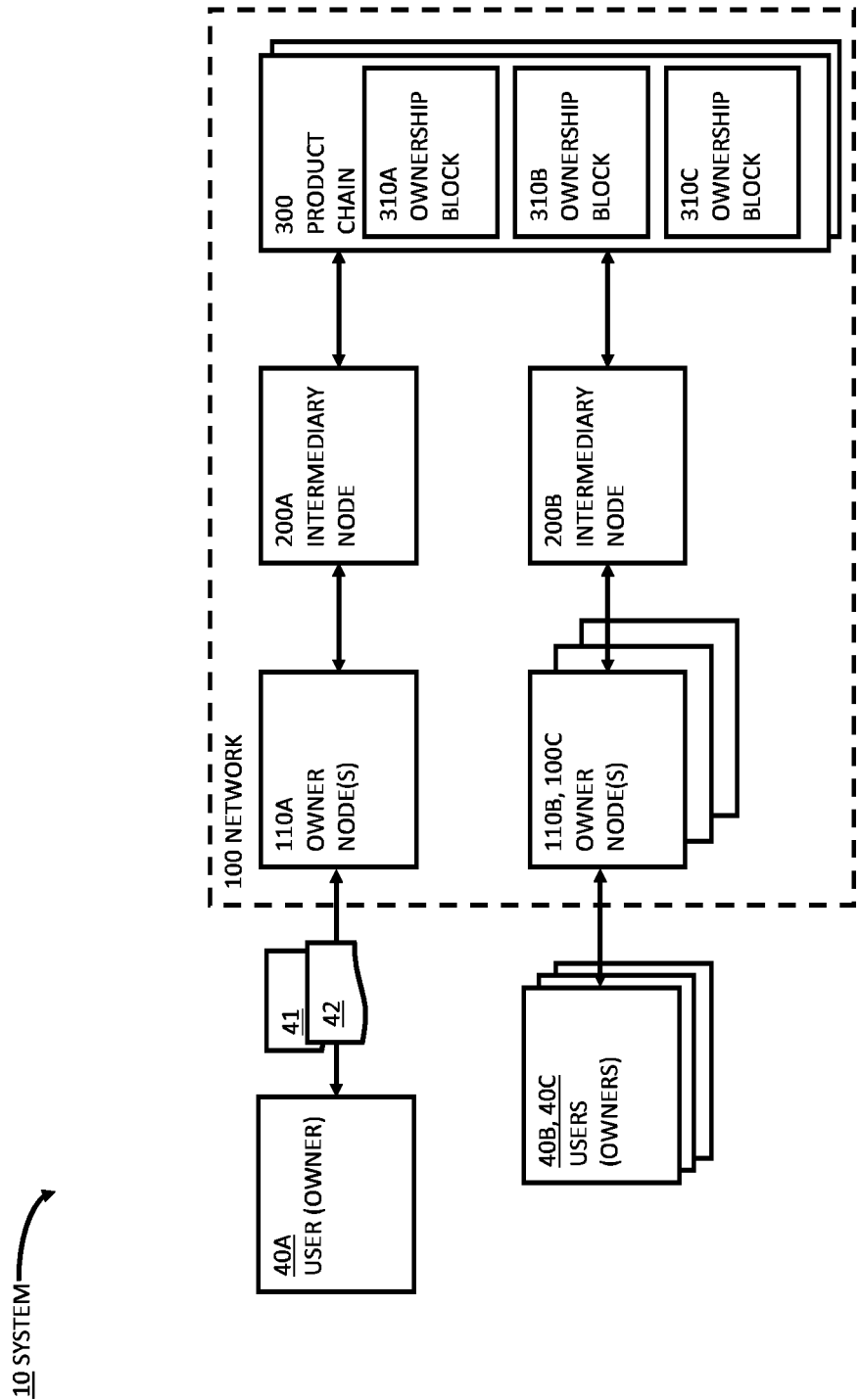
FIG. 5 is a block diagram, depicting an example of a system for manipulating a product chain data structure, to transfer, or manage transferal of data representing one or more transactions between computing nodes of a computer network, the computer network including a plurality of intermediary nodes, according to some embodiments.

Reference is now made to FIG. 5 which is a block diagram, depicting an example of a system for maintaining and/or manipulating a product chain data structure, to transfer, or manage transferal of data representing one or more transactions between computing nodes of a computer network, the computer network including a plurality of intermediary nodes 200 (e.g., 200A, 200B), according to some embodiments. For example, a first owner (e.g., current owner 40A) may have a user account at a first intermediary node 200 (e.g., 200A) and a second owner (e.g., subsequent owner 40B) may have a user account at a second intermediary node 200 (e.g., 200B). Additionally, or alternatively, the user accounts may be identifiable by an owner identifier (e.g., an identity number), pertaining to one or more (e.g., each) owner.

For example, a current owner (e.g., 40A, the carpenter) may communicate or input data representing a first transaction request 42 to a first intermediary node 200A such as a banking server and/or an issuer server that handles an account (e.g., a banking account) of the current owner 40A. Current owner 40A may be recognizable by first intermediary node 200A for example by a proprietary owner identifier. According to some embodiments of the invention, current owner 40A may include the first owner identifier in the first transaction request 42. For example, current owner 40A may use their private key to sign the included owner identifier. First intermediary node 200A may receive the data representing transaction request 42 from the first computing node 110 (e.g., 110A) of current owner 40A and perform authentication of the received first transaction request 42 as originating from the current owner 40A in the last ownership block of the product chain 300, based on the owner identifier (e.g., by using the current owner's public key from the current owner's credit card, as elaborated herein). As explained herein, first intermediary node 200A may append a new ownership block 310 on product chain 300, indicating or representing transfer ownership of the product from the current owner 40A to a subsequent owner 40B (which is hence regarded as the new current owner). According to some embodiments, the now current owner may have their account handled by a second intermediary node 200B. In this condition, owner 40B may perform a subsequent transferal of ownership and/or payment to a subsequent owner (e.g., 40C), by appending a respective, subsequent ownership block 310 via second intermediary node 200B, in a similar manner to that described above (e.g., in relation to intermediary node 200A).

Figure 6:
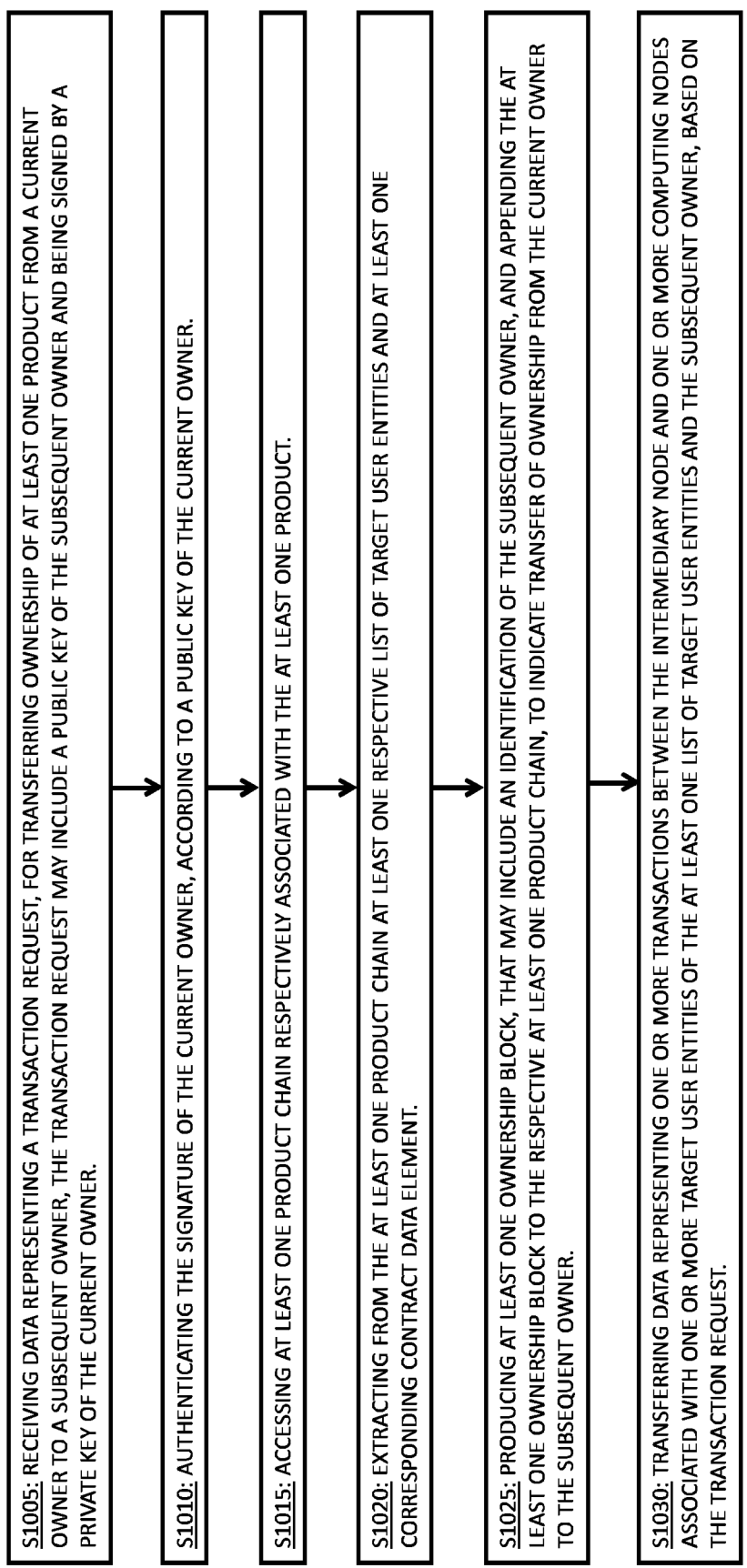
FIG. 6 is a flow diagram, depicting a method of maintaining a product chain data structure, to transfer, or manage transferal of data representing one or more transactions between computing nodes of a computer network, according to some embodiments.

Reference is now made to FIG. 6 which is a flow diagram, depicting a method of maintaining a product chain data structure, to transfer, or manage transferal of data representing or describing one or more transactions between computing nodes of a computer network, according to some embodiments.

As shown in step S1005, a processor or controller (e.g., element 2 of FIG. 1) of an intermediary node (e.g., element 200 of FIG. 2) may receive data representing a transaction request (e.g., element 42 of FIG. 2). The transaction request may, for example, be for transferring ownership of at least one product from a current owner (e.g., element 40A of FIG. 2) to a subsequent owner (e.g., element 40B of FIG. 2). The data representing transaction request 42 may include a public key of the subsequent owner and may be signed by a private key of the current owner.

As shown in step S1010, processor 2 may authenticate the signature of the current owner, according to a public key of the current owner.

As shown in step S1015, processor 2 may access at least one product chain (e.g., element 300 of FIG. 2) that may be respectively associated with the at least one product.

As shown in step S1020, processor 2 may extract, from the at least one product chain 300, at least one respective list of target user entities (e.g., previous owners and non-owner entities listed in ownership blocks 310 of product chains 300) and at least one corresponding contract data element (e.g., elements 314 of FIG. 3).

As shown in step S1025, processor 2 may produce at least one ownership block (e.g., element 310 of FIG. 2), comprising an identification of the subsequent owner. Processor 2 may append the at least one ownership block 310 to the respective at least one product chain 300, to indicate transfer of ownership from the current owner to the subsequent owner.

As shown in step S1030, processor 2 may transfer data representing one or more transactions (e.g., elements 210 of FIG. 2) between the intermediary node 200 and one or more computing nodes (e.g., elements 110A, 110B, 110C, 40A and 40B of FIG. 2) associated with one or more target user entities of the at least one list of target user entities and the subsequent owner, based on the transaction request, as elaborated herein As elaborated herein, embodiments of the invention may provide a practical application for transferring and/or managing transferal of data representing transactions, such as ME transactions.

Embodiments of the invention may provide new and improved data structures which may, on the one hand, effectivley represent product-related properties, including relationships among corresponding entities (e.g., owners and non-owners of the products) and may, on the other hand, facilitate transactions (e.g., ME transactions) among these entities in a manner that is more efficient than currently available technologies for transferal of data transactions (e.g., ME transactions).

For example, embodiments of the invention may perform one or more transactions (e.g., ME transactions) at substantially the same time, or concurrently through one or more respective banking systems. This element of concurrency may provide improvements over prior technology.

For example when processing data representing transactions 201, embodiments of the invention may eliminate dependency of performance of one transaction (e.g., one payment) on successful fulfillment of another transaction (e.g., another payment, down the product chain).

Moreover, in scenarios where a large number of target user entities and/or products are involved, the element of concurrency may include an additional improvement over prior technology: centrally resolving payment conditions, and distributing the required transactions (e.g., payments) to relevant computing devices (e.g., banking servers) in a parallel manner, as "atomic-level" transactions, as elaborated herein, may reduce network traffic, and processing time, and may also reduce computational requirements from the recipients of the transactions (e.g., banking servers).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. Further, features or elements of different embodiments may be used with or combined with other embodiments.

The invention claimed is:

1. A method of transferring data representing one or more blockchain-based transactions between computing nodes of a computer network by at least one intermediary node, the method comprising:

receiving data representing a transaction request, for transferring ownership of at least one product from a current owner to a subsequent owner, the transaction request comprising a public key of the subsequent owner and being signed by a private encryption key of the current owner;

authenticating the signature of the current owner, according to a public key of the current owner;

accessing at least one product chain respectively associated with the at least one product;

extracting from the at least one product chain at least one respective list of target user entities and at least one corresponding contract data element, wherein one or more of the target user entities are non-owner users;

producing at least one ownership block, comprising an identification of the subsequent owner, and appending the at least one ownership block to the respective at least one product chain, to indicate transfer of ownership from the current owner to the subsequent owner, wherein the at least one ownership block comprises a type of the owner and an identification of one or more of the non-owner users;

transferring data representing one or more transactions between the intermediary node and one or more computing nodes associated with one or more target user entities of the at least one list of target user entities and the subsequent owner, based on the transaction request;

enabling a subsequent owner to confirm the transfer, by:
sending one or more data elements of the transaction request to the computing node of the subsequent owner;
receiving a confirmation indication from the computing node of the subsequent owner;
and
subsequently appending the at least one ownership block and the performance of the one or more transactions including target user entities and at least one corresponding contract data element to the respective at least one product chain, based on the analysis of the confirmation indication.

2. The method of claim 1, wherein the transaction request further comprises an ownership code associated with the current owner, and wherein the method further comprises:
analyzing the ownership code; and
accessing the at least one product chain based on said analysis.

3. The method of claim 2, further comprising: calculating the ownership code as a function of a private key of the current owner and an identification of the at least one product chain.

4. The method of claim 2, wherein analyzing the ownership code comprises extracting the identification of the at least one product chain from an ownership code, and wherein accessing the at least one product chain comprises:
authenticating the identity of the current owner based on a public key of the current owner; and
accessing the at least one product chain according to the extracted product chain identification.

5. The method of claim 1, wherein the transaction request further comprises a null price value, and wherein the one or more transactions between the intermediary node and one or more computing nodes comprises notification transactions pertaining to transfer of ownership from the current owner to the subsequent owner.

6. The method of claim 1, wherein the transaction request further comprises a price of the at least one product, and wherein the method further comprises performing arbitration of the price among one or more target user entities and the subsequent owner according to the one or more contract data elements, and wherein performing one or more transactions comprises performing monetary exchange (ME) transactions among the one or more target user entities and the subsequent owner according to the arbitration.

7. The method of claim 6 wherein the one or more ME transactions are performed substantially concurrently.

8. The method of claim 1, wherein the one or more target user entities are selected from a list consisting of: the current owner, one or more previous non-owner users and one or more previous owners of the at least one product.

9. The method of claim 1, wherein the public key of the subsequent owner of the at least one product comprises an identification of a paying instrument associated with the subsequent owner.

10. The method of claim 1, wherein the at least one product chain is a distributed block chain data element, comprising one or more ownership blocks, wherein each ownership block comprises at least one of:
an identification of an owner of the product;
a public key associated with the owner;
and
a contract element pertaining to transfer of ownership between the owner and at least one other owner in the product chain.

11. The method of claim 1, further comprising repeating the steps of receiving, authenticating, accessing, extracting, producing and appending in a plurality of iterations, until a trigger condition is met.

12. The method of claim 1, wherein the at least one contract data element is selected from a list consisting of: a definition of a contract relation, a definition of a trigger condition and a definition of a contract timing condition.

13. The method of claim 1 wherein performing the one or more transactions is done in response to occurrence of a trigger event that meets at least one of the trigger condition and contract timing condition.

14. The method of claim 1, wherein the at least one transaction request pertains to a plurality of products and comprises:
an identification of a plurality of product chains associated with the respective plurality of products; and
a plurality of prices associated with the respective plurality of products.

15. The method of claim 1 further comprising: updating an ownership block of the current owner, to comprise one or more data elements pertaining to resolution of a payment, selected from a list consisting of: an identity of one or more target user entities and a respective payment amount.

16. A system for transferring data representing one or more blockchain-based transactions between computing nodes of a computer network, the system comprising a non-transitory memory device, wherein modules of instruction code are stored, and a processor associated with the memory device, and configured to execute the modules of instruction code, whereupon execution of said modules of instruction code, the processor is further configured to:
receive data representing a transaction request, for transferring ownership of at least one product from a current owner to a subsequent owner, the transaction request comprising a public key of the subsequent owner and being signed by a private encryption key of the current owner;
authenticate the signature of the current owner, according to a public key of the current owner;
access at least one product chain respectively associated with the at least one product;
extract from the at least one product chain at least one respective list of target user entities and at least one corresponding contract data element, wherein one or more of the target user entities are non-owner users;
produce at least one ownership block, comprising an identification of the subsequent owner, wherein the at least one ownership block comprises a type of the owner and an identification of one or more of the non-owner users;
append the at least one ownership block to the respective at least one product chain, to indicate transfer of ownership from the current owner to the subsequent owner;
transfer data representing one or more transactions between the intermediary node and one or more computing nodes associated with one or more target user entities of the at least one list of target user entities and the subsequent owner, based on the transaction request;

enable a subsequent owner to confirm the transfer, by:

sending one or more data elements of the transaction request to the computing node of the subsequent owner;

receiving a confirmation indication from the computing node of the subsequent owner;

subsequently append the at least one ownership block and the performance of the one or more transactions including target user entities and at least one corresponding contract data element to the respective at least one product chain, based on the analysis of the confirmation indication.

17. A non-transitory computer readable storage medium storing a set of instructions for causing a computer to transfer data representing one or more blockchain based transactions between computing nodes of a computer network, by performing the operations of:

receiving data representing a transaction request, for transferring ownership of at least one product from a current owner to a subsequent owner, the transaction request comprising a public key of the subsequent owner and being signed by a private encryption key of the current owner;

authenticating the signature of the current owner, according to a public key of the current owner;

accessing at least one product chain respectively associated with the at least one product;

extracting from the at least one product chain at least one respective list of target user entities and at least one corresponding contract data element, wherein one or more of the target user entities are non-owner users;

producing at least one ownership block, comprising an identification of the subsequent owner, and appending the at least one ownership block to the respective at least one product chain, to indicate transfer of ownership from the current owner to the subsequent owner, wherein the at least one ownership block comprises a type of the owner and an identification of one or more of the non-owner users; and transferring data representing one or more transactions between the intermediary node and one or more computing nodes associated with one or more target user entities of the at least one list of target user entities and the subsequent owner, based on the transaction request;

enabling a subsequent owner to confirm the transfer, by:

sending one or more data elements of the transaction request to the computing node of the subsequent owner;

receiving a confirmation indication from the computing node of the subsequent owner;

and subsequently appending the at least one ownership block and the performance of the one or more transactions including target user entities and at least one corresponding contract data element to the respective at least one product chain, based on the analysis of the confirmation indication.

* * * * *